(12) United States Patent
Wang et al.

(10) Patent No.: US 11,293,436 B2
(45) Date of Patent: Apr. 5, 2022

(54) VACUUMING DEVICE AND VACUUM APPARATUS

(71) Applicant: Hong Wang, Xiangyang (CN)

(72) Inventors: Hong Wang, Xiangyang (CN); Yusheng Wang, Xiangyang (CN)

(73) Assignee: Hong Wang, Xiangyang (CN)

( * ) Notice: Subject to any disclaimer, the term of this patent is extended or adjusted under 35 U.S.C. 154(b) by 235 days.

(21) Appl. No.: 16/499,322

(22) PCT Filed: Mar. 26, 2018

(86) PCT No.: PCT/CN2018/080493
§ 371 (c)(1),
(2) Date: Sep. 29, 2019

(87) PCT Pub. No.: WO2018/177249
PCT Pub. Date: Oct. 4, 2018

(65) Prior Publication Data
US 2021/0102537 A1 Apr. 8, 2021

(30) Foreign Application Priority Data
Mar. 29, 2017 (CN) .......................... 201710199072.7

(51) Int. Cl.
*F04C 23/02* (2006.01)
*F04C 25/02* (2006.01)
(Continued)

(52) U.S. Cl.
CPC .............. *F04C 23/02* (2013.01); *F04C 25/02* (2013.01); *F04C 29/023* (2013.01);
(Continued)

(58) Field of Classification Search
CPC .... F04C 18/344; F04C 18/3441; F04C 23/02; F04C 25/02; F04C 29/02; F04C 29/028;
(Continued)

(56) References Cited

U.S. PATENT DOCUMENTS 4,652,214 A * 3/1987 Fabel .................... F04C 23/008
277/391
8,202,072 B2 * 6/2012 Schneider ............... F04C 27/02
418/97

(Continued)

FOREIGN PATENT DOCUMENTS

CN 204827926 U 12/2015
CN 205064272 U 3/2016
(Continued)

*Primary Examiner* — Devon C Kramer
*Assistant Examiner* — Joseph S. Herrmann
(74) *Attorney, Agent, or Firm* — Cheng-Ju Chiang

(57) ABSTRACT

A vacuuming device comprises a main body, a rotary shaft, a vacuum pump rotor, a motor stator and a motor rotor. An air inlet, an air outlet, an oil storage chamber and a motor chamber are disposed in the main body. The oil storage chamber communicates with the air outlet. The rotary shaft is rotationally connected to the main body. The vacuum pump rotor is fixedly mounted to the rotary shaft and cooperatively forms a stator cavity of the vacuum pump with the inner-wall of the main body. The air inlet and the oil storage chamber communicate with the stator cavity of the vacuum pump respectively. The vacuuming device reduces the cost of manufacturing, optimizes the spatial structure and downsizes the device.

15 Claims, 6 Drawing Sheets

(51) Int. Cl.
*F04C 29/02* (2006.01)
*F04C 18/344* (2006.01)

(52) U.S. Cl.
CPC ........ *F04C 29/028* (2013.01); *F04C 18/3441* (2013.01); *F04C 2240/60* (2013.01)

(58) Field of Classification Search
CPC . F04C 29/023; F04C 2240/60; H02K 1/2786; H02K 21/22; H02K 5/12; H02K 5/128; H02K 5/1285
See application file for complete search history.

(56) References Cited

U.S. PATENT DOCUMENTS

| | | | |
|---|---|---|---|
| 2005/0260082 A1* | 11/2005 | Conrad | F04C 18/3442 417/410.3 |
| 2007/0286749 A1* | 12/2007 | Wagner | F04C 29/0064 417/410.1 |
| 2008/0145257 A1 | 6/2008 | Schneider et al. | |
| 2014/0248167 A1 | 9/2014 | Sugimoto et al. | |
| 2014/0363319 A1* | 12/2014 | Carboneri | F04C 25/02 417/372 |
| 2015/0014007 A1* | 1/2015 | Ukai | B25B 23/0064 173/46 |

FOREIGN PATENT DOCUMENTS

| | | | |
|---|---|---|---|
| CN | 106704185 A | | 5/2017 |
| CN | 206694251 U | | 12/2017 |
| JP | 01178789 A | * | 7/1989 |

\* cited by examiner

VACUUMING DEVICE AND VACUUM APPARATUS

CROSS-REFERENCE TO RELATED APPLICATIONS

This application is a 35 U.S.C. § 371 National Phase conversion of International (PCT) Patent Application No. PCT/CN2018/080493, filed on Mar. 26, 2018, which claims the benefit of priority to Chinese Patent Application No. 201710199072.7 titled "vacuuming device and vacuum apparatus", filed with the China State Intellectual Property Office on Mar. 29, 2017, the disclosures of which are hereby incorporated by reference in their entirety. The PCT International Patent Application was filed and published in Chinese.

TECHNICAL FIELD

The present invention relates to the field of vacuum technology, and more particularly to a vacuuming device and a vacuum apparatus using the same.

BACKGROUND

Vacuum pump is an equipment being used to pump down the air in the container with effective volume to realize vacuum state by mechanical, physical, chemical or physical-chemical methods, and its general application pattern in conventional field, such as automotive field, as followings: the output shaft of the internal combustion engine connected with the vacuum pump, and the output power from the internal combustion engine be transferred to the motor and the vacuum pump through the belt drive and shaft drive.

However, the current vacuum pumps generally exist the following drawbacks: unreasonable structure design, the number of components is not minimized, large size caused by inappropriate use of space, high costs of raw materials and processing and so on.

SUMMARY OF INVENTION

For example, an object of the present application is to provide a vacuuming device with the feature of simple structure, small size, reasonable proportion of the space, and low manufacturing cost.

Another object of the present application is to provide a vacuum apparatus using the above vacuuming device, which be capable of effectively optimizing its structure, reducing its size, decreasing the number of components, and cost down in manufacturing.

The embodiments of the present invention are implemented as follows:

The embodiments of the present invention provides a vacuuming device, comprises a main body, a rotary shaft, a vacuum pump rotor, a motor stator and a motor rotor; the main body is provided with an air inlet, an air outlet, an oil storage chamber and an motor chamber; the oil storage chamber communicates with the air outlet, and the rotary shaft is rotationally connected to the main body; the vacuum pump rotor is fixedly mounted to the rotary shaft and cooperatively forms a stator cavity of the vacuum pump with the inner wall of the main body; wherein the air inlet and the oil storage chamber communicate with the stator cavity of the vacuum pump respectively; both the motor stator and the motor rotor are arranged in the motor chamber, and the motor stator is fixedly connected to the main body, and the motor rotor is fixedly connected to the rotary shaft.

Preferably, the main body is provided with an oil and air outlet passage, and one end of the oil and air outlet passage is corresponding to the vacuum pump rotor, the other end of the oil and air outlet passage is communicating with the motor chamber.

Preferably, the main body comprises a main structure, and the oil and air outlet passage locates inside the main structure; the internal of the main structure is provided with a shaft mounting hole, and the shaft mounting hole is configured to install the rotary shaft, and the oil and air outlet passage is arranged above the shaft mounting hole.

Preferably, the main body further comprises a first end cap connected with the main structure, and the first end cap and the main structure cooperatively forms a vacuum cartridge, the oil storage chamber and a communicating chamber; the vacuum cartridge is configured to mount the vacuum pump rotor, and the vacuum cartridge is communicating with one end of the oil and air outlet passage, and the oil storage chamber and the communicating chamber are communicating with each other; the air inlet and the air outlet are arranged on the first end cap; wherein the air inlet is communicated with the vacuum cartridge, and the air outlet is communicated with the communicating chamber.

Preferably, a check valve corresponding to the air inlet is arranged on the first end cap to realize the outside air flow into the vacuum cartridge in one-way flow.

Preferably, the main body further comprises a second end cap attached to the end of the main structure away from the first end cap; the second end cap and the main structure cooperatively define the motor chamber, and the motor chamber is communicating with the end of the oil and air outlet passage away from the vacuum cartridge.

Preferably, the motor stator locates inside the area bounded by the motor rotor; wherein several annular silicon steel sheets are arranged between the motor stator and the motor rotor, and the end of the oil and air outlet passage away from the vacuum cartridge communicates with a second annular oil passage; wherein the second annular oil passage is bounded by the inner walls of the main body, the silicon steel sheets and the motor stator.

Preferably, the motor rotor locates inside the area bounded by the motor stator; wherein several annular silicon steel sheets are arranged between the motor stator and the motor rotor, and the end of the oil and air outlet passage away from the vacuum cartridge communicates with a second annular oil passage; wherein the second annular oil passage is bounded by the inner walls of the main body, the silicon steel sheets and the motor rotor.

Preferably, a gap is arranged between the motor stator and the motor rotor, and the oil and air outlet passage communicates with the motor chamber through the gap.

Preferably, the gap communicates with the oil storage chamber through a through-hole.

Preferably, the rotary shaft is provided with a first annular oil passage, an oil suction hole and an oil suction passage; wherein the oil storage chamber, the first annular oil passage, the oil suction hole, the oil suction passage and the stator cavity of the vacuum pump successively communicates with each other.

Preferably, the first annular oil passage is disposed on the outer wall of the rotary shaft; the oil suction hole extends along the radial direction of the rotary shaft, and the oil suction passage is assembled in the internal of the rotary shaft and extends along the axial direction of the rotary shaft.

Preferably, an oil suction pipe is disposed on the main body, and one end of the oil suction pipe communicates with the first annular oil passage, the other end of the oil suction pipe communicates with the oil storage chamber.

Preferably, the main body comprises a main structure, and the internal of the main structure is provided with a shaft mounting hole; wherein the shaft mounting hole is configured to install the rotary shaft; the main structure further comprises a communicating hole, and one end of the communicating hole communicates with the first annular oil passage, the other end of the communicating hole communicates with the oil storage chamber.

Preferably, the motor stator connects to a wiring harness extending to the outside of the main body via the air outlet; and a gap is arranged between the motor stator and the motor rotor, and the gap communicates with the oil storage chamber through a through hole running through the motor stator and the main body; the oil and air outlet passage assembled on the main body communicates with the motor chamber through the gap.

Preferably, the motor stator is arranged inside the region bounded by the motor rotor.

Preferably, the motor rotor is arranged inside the region bounded by the motor stator.

Preferably, the rotary shaft comprises a pump shaft and a motor shaft, and the pump shaft is molded in one body with the motor shaft.

Preferably, the vacuuming device further comprises a pump housing connected with the main body, and the pump housing is assembled on the outside of the main body; a mounting space and an oil tank are formed between the pump housing and the main body, and the oil tank and the mounting space are communicating with each other; the mounting space is configured to be mounted at least one of the electrical components, a circuit board, and heat sinks; the oil tank communicates with the oil storage chamber.

A vacuum apparatus comprises the vacuuming device as any one of above-mentioned.

Compared with the existing technology, the beneficial effects of the disclosed embodiments of the present invention as follows, for example:

In summary, the vacuuming device comprises the main body, the rotary shaft, the vacuum pump rotor, the motor stator and the motor rotor; the main body is provided with the air inlet, the check valve, the air outlet, the oil storage chamber and the motor chamber; the oil storage chamber communicates with the air outlet, and the rotary shaft is rotationally connected to the main body; the vacuum pump rotor is fixedly mounted to the rotary shaft and cooperatively forms the stator cavity of the vacuum pump with the inner wall of the main body; the air inlet and the oil storage chamber communicate with the stator cavity of the vacuum pump respectively; both the motor stator and the motor rotor are arranged in the motor chamber, and the motor stator is fixedly connected to the main body, and the motor rotor is fixedly connected to the rotary shaft. In the vacuuming device provided in the present invention, the conventional vacuum pump, the conventional tank and the conventional motor are modified and cleverly combined together to form an integrated vacuuming structure. Thereby eliminating the raw materials and manufacturing costs of many components used to successively connect the conventional motor, the vacuum pump and the tank, which are independent manufactured in the conventional vacuuming device, and two independent ends can be removed in the oil tank; the oil tank is directly formed by the main body, rather than be set independently. In such a manner that not only the manufacturing costs can be greatly reduced, but also optimizing the spatial structure, downsizing the entire volume of the vacuuming device (or assembly length), effectively overcome the deficiencies of the conventional vacuum pump.

The vacuum apparatus comprises the above-described vacuuming device, its structure can be effectively optimized, and its size can be reduced, thereby reducing manufacturing costs, overcoming the drawbacks of the conventional vacuum apparatus.

BRIEF DESCRIPTION OF DRAWINGS

In order to more clearly illustrate the embodiments of the present invention, the drawings used in the embodiments will be briefly described below. It should be understood that, the following drawings in the description are only a part of the embodiments of the present invention, which should not be considered as limitation of the scope of the present invention, and any person skilled in the art can obtain other related drawings based on these drawings without any creative work.

Figure 1:
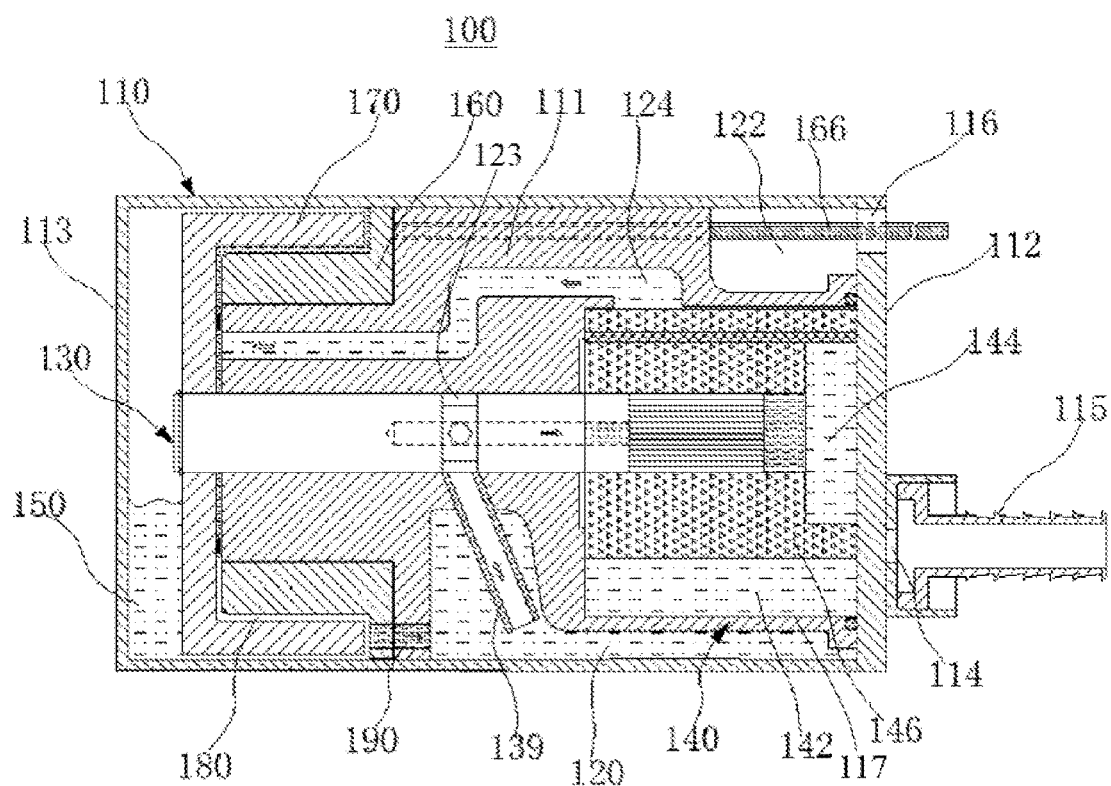
FIG. 1 is a perspective view of the first form of a first vacuuming device in accordance with an embodiment of the present invention.

Reference numerals in the Figures: 100—vacuuming device; 101—pump housing; 102—mounting space; 103—electrical components; 104—circuit board; 105—oil tank; 106—mounting holes assembly; 107—electrical store cover; 108—heat sink; 110—main body; 111—main structure; 112—first end cap; 113—second end cap; 114—air inlet; 115—check valve; 116—air outlet; 117—inner wall of the main body; 120—oil storage chamber; 122—communicating chamber; 123—shaft mounting hole; 124—oil and air outlet passage; 126—second annular oil passage; 130—rotary shaft; 132—motor shaft; 134—pump shaft; 136—first annular oil passage; 137—oil suction hole; 138—oil suction passage; 139—oil suction pipe; 140—vacuum cartridge; 142—stator cavity of the vacuum pump; 144—oil transition chamber; 146—vacuum pump rotor; 148—vane; 150—motor chamber; 160—motor stator; 162—line package; 164—silicon steel sheet; 166—wiring harness; 170—motor rotor; 180—gap; 190—through-hole; 201—communicating hole; 202—baffle; 203—oil injection hole.

DESCRIPTION OF EMBODIMENTS

In order to more clearly illustrate the object, the technique project and the characteristics of the embodiments of the present invention, the technical solutions in the embodiments of the present will be clearly and fully described with the accompanying drawings of the embodiments of the present invention. Obviously, the following described embodiments in the description are only a part of the embodiments of the present invention, rather than all the embodiments. Generally, the components described and shown in the drawings could be arranged and designed in a variety of different configurations.

Accordingly, the following detailed description of the disclosed embodiments provided in the figures are only the selected embodiments of the present disclosure, rather than intended to limit the scope of the disclosure as claimed. Based on the embodiments in the present disclosure, other embodiments without creative effort modified by any person skilled in the art shall fall within the protection scope of the present invention.

It should be noted: similar reference numerals and letters refer to similar items in the following figures, and if an item is defined in one figure, then the following figures need not be further defined and explained.

It should be noted that, in the description of the present disclosure, the terms indicating direction or location relationship, such as "center", "upper", "lower", "left", "right", "vertical", "horizontal", "inner", "outer" and so on, which are adapted to indicate the position or orientation based on the direction or location shown in the figures, or indicate the position or orientation usual placing of the product provided in the invention. The purpose of the above definition is only describing the present disclosure and simplify the description, rather than indicative device or element referred to must have or imply a particular orientation, the orientation of a particular configuration and operation, cannot be construed as limiting the present disclosure.

Further, the terms "first", "second," "third," etc. are used merely to distinguish description, not to be construed to indicate or imply relative importance.

Further, the terms "horizontal", "vertical" and the like terms are not absolute levels or requirements depending member, but may be slightly inclined. For example: "horizontal" refers to a direction being comparatively a clinic in terms of "vertical" level, does not mean that the structure must be completely horizontal, but may be slightly inclined.

It also should be noted that, in the description of the present disclosure, unless expressly specified or limited is described, if the terms "set", "mount", "communicate to", "connect" should be broadly understood. For example, can be fixedly connection, can be detachable connection, or integrally connected; can be mechanical connection, can be electrically connection; can be directly connected, can also be connected indirectly through intervening structures, or it may be communicating with each other in the interior of the two components. For any person skilled in the art, the specific meanings can be appreciated according to the specific circumstances in the present disclosure.

Referring to FIG. 1, the present embodiment provides a first vacuuming device 100 comprising a main body 110, a rotary shaft 130, a vacuum pump rotor 146, a motor stator 160 and a motor rotor 170.

Wherein the upper portion of the main body 110 has a circular shape, and the lower portion has a square shape, so as to increase the inner space of the lower portion of the main body 110, thereby increasing the oil capacity of the main body 110. The main body 110 comprises a main structure 111, a first end cap 112 and a second end 113. The internal of the main structure 111 is provided with a shaft mounting hole 123 and an oil and air outlet passage 124, and the oil and air outlet passage 124 is arranged above the shaft mounting hole 123.

The first end cap 112 is fixed to one end of the main structure 111 via a bolt, and the first end cap 112 and the main structure 111 cooperatively enclose a vacuum cartridge 140, oil storage chamber 120 and a communicating chamber 122. The vacuum cartridge 140 communicates with one end of the oil and air outlet passage 124, and the oil storage chamber 120 and the communicating chamber 122 are communicate with each other. An air inlet 114 and an air outlet 116 are assembled on the first end cap 112, and the air inlet 114 is communicated with the vacuum cartridge 140, and the air outlet 116 is communicated with the communicating chamber 122.

In order to prevent air entering the vacuum cartridge 140 from going back to the outside through the air inlet 114, in the present embodiment, a check valve 115 corresponding to the location of the air inlet 114 is arranged on the first end cap 112, in such manner that the gas from the atmosphere can only flow into the pump (the vacuum cartridge 140) in one-way flow.

The second end cap 113 is attached to the end of the main structure 111 away from the first end cap 112 by a bolt, and the second end cap 113 and the main structure 111 cooperatively forms the motor chamber 150; and the motor chamber 150 communicates with the end of the oil and air outlet passage 124 away from the vacuum cartridge 140.

Figure 4:
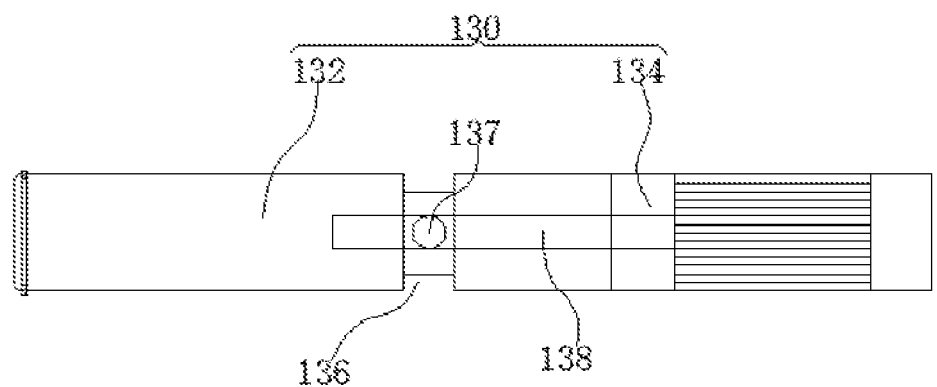
FIG. 4 is a perspective view of the rotary shaft in the first vacuuming device in accordance with an embodiment of the present invention.

Referring to FIG. 4, the rotary shaft 130 is rotationally connected with the inside of the main body 110 and it is arranged in the shaft mounting hole 123. The forms and structures of the rotary shaft 130 can be varied, in this embodiment, the rotary shaft 130 comprises a motor shaft 132 and a pump shaft 134 integrated with the motor shaft 132.

Figure 5:
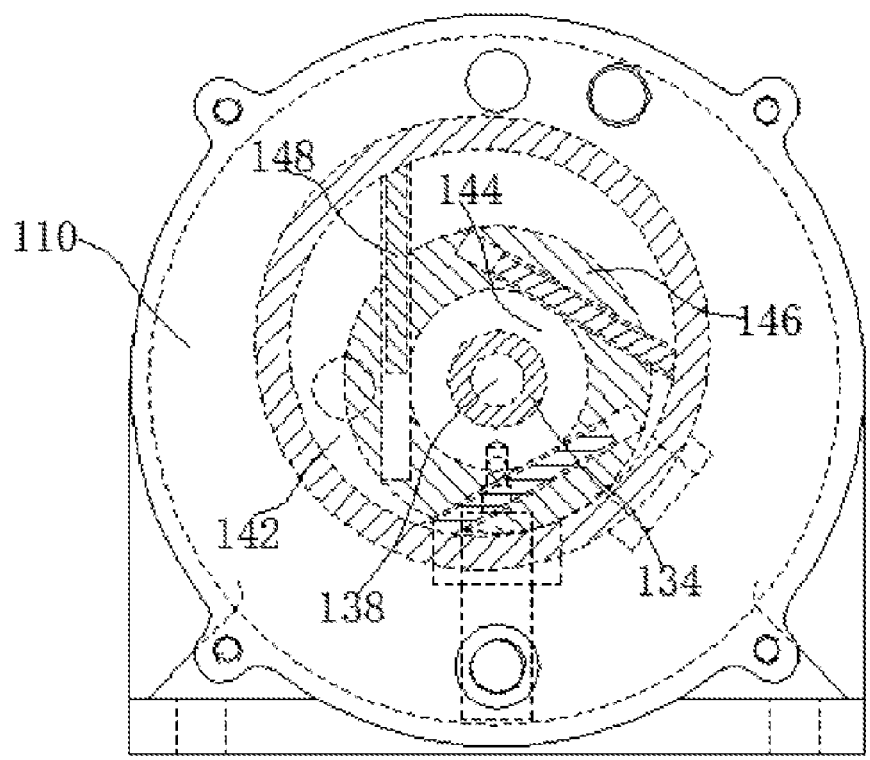
FIG. 5 is an end perspective view of the main body of the first vacuuming device in accordance with an embodiment of the present invention.

The vacuum pump rotor 146 is fixedly mounted to the rotary shaft 130 and it is positioned within the vacuum cartridge 140, and the vacuum pump rotor 146 is corresponding to the end of the oil and air outlet passage 124 away from the motor chamber 150. Referring to FIG. 5, the vacuum pump rotor 146 is provided with a plurality of sliding chutes and a plurality of vanes 148, and a plurality of vanes 148 are sliding connected to the internal of the plurality of sliding chutes respectively and can be abutted against the inner wall of the vacuum chamber under a centrifugal force (the related supporting structure for the vacuum pump and the operational principles are prior art and need not be repeated here). The vacuum pump rotor 146, the vanes 148 and the first end cap 112 cooperatively form an oil transition chamber 144 and a stator cavity of the vacuum pump 142.

The side of the oil transition chamber 144 away from the first end cap 112 communicates with the oil storage chamber 120. There are several structures and means can be used to achieve communicating with the oil storage chamber 120, in this embodiment, the rotary shaft 130 is provided with a first annular oil passage 136, an oil suction hole 137 and an oil suction passage 138. The first annular oil passage 136 is disposed on the outer wall of the rotary shaft 130, and the oil suction passage 138 is assembled in the internal of the rotary shaft 130 and extended along the axial direction of the rotary shaft 130. The oil storage chamber 120, the first annular oil passage 136, the oil suction hole 137, the oil suction passage 138 and the oil transition chamber 144 successively communicated with each other, that is, the oil storage chamber 120 communicates with the oil transition chamber 144 through the first annular oil passage 136, the oil suction hole 137 and the oil suction passage 138. The stator cavity of the vacuum pump 142 communicates with the oil transition chamber 144. And the stator cavity of the vacuum pump 142 communicates with the air inlet 114.

In this embodiment, the oil suction hole 137 is disposed and extended along the radially of the rotary shaft 130, and either penetrating the rotary shaft 130 or not.

In order to facilitate the oil in the oil storage chamber 120 successfully entering into the oil transition chamber 144 through the first annular oil passage 136, the oil suction hole 137 and the oil suction passage 138. In this embodiment, the main body 110 is provided with an oil suction pipe 139 positioned under the rotary shaft 130. One end of the oil suction pipe 139 is communicated with the first annular oil passage 136, the other end of the oil suction pipe 139 is closed to the bottom of the main body 110 and communicated with the oil storage chamber 120.

The motor stator 160 and the motor rotor 170 are positioned within the motor chamber 150, and the motor stator 160 is fixedly connected to the main body 110 and connected to a wiring harness 166 extending to the outside of the main body 110 via the air outlet 116, and the motor rotor 170 is fixedly connected to the rotary shaft 130. A gap 180 is arranged between the motor stator 160 and the motor rotor 170, and the gap 180 communicates with the oil storage chamber 120 through a through hole 190 running through the motor stator 160 and the main body 110. The oil and air outlet passage 124 communicates with the motor chamber 150 through the gap 180.

The ways of the connection between the motor stator 170 and the motor rotor 160 take in various structural forms, in this embodiment, the motor stator 160 locates inside the area forming by the motor rotor 170, that is an outer-rotor motor structure (the related supporting structure for the motor and the operational principles are prior art and need not be repeated here).

Of course, an inner-rotor motor structure also works and can be selected.

In this embodiment, the working principle and process of the vacuuming device 100 as follows:

During applying the present invention, the motor rotor 170 is rotating driven by the motor stator 160 and transfer the rotation through the motor shaft 132 and the pump shaft 134 successively, then the vacuum pump rotor 146 is driven to rotate, in such a manner that the air inlet 114 is driven to absorb the air into the stator cavity of the vacuum pump 142, meanwhile the oil in the oil storage chamber 120 is absorbed into the oil transition chamber 144 after pass through the oil suction pipe 139, the first annular oil passage 136, the oil suction hole 137 and the oil suction passage 138 successively, and the oil in the oil transition chamber 144 is mixed with the air in the stator cavity of the vacuum pump 142 through the vane 148 and the gap 180 of the vacuum cartridge 140. With the rotation of the vacuum pump rotor 146, the mixed fuel-air mixture moves in the vacuum cartridge 140, and the oil is discharged through the oil and air outlet passage 124 as reaching the preset position (the compression pressure reaching the maximum value). Firstly, the gas and oil discharged through the oil and air outlet passage 124 flows into the gap 180 and contacts with the surface of the motor stator 160 and the motor rotor 170, so as to achieve that the motor stator 160 and the motor rotor 170 is cooled; Secondly, the gas and oil discharged through the oil and air outlet passage 124 is discharged into the oil storage chamber 120, then under the pressure, the gas is discharged through the communicating chamber 122 and the air outlet 116, and the oil is deposited in the oil storage chamber 120 and waiting for the next time working.

In summary, according to this embodiment, the vacuuming device 100 comprises the main body 110, the rotary shaft 130, the vacuum pump rotor 146, the motor stator 160 and the motor rotor 170. The main body 110 is provided with the air inlet 114, the check valve 115, the air outlet 116, the oil storage chamber 120 and the motor chamber 150. The oil storage chamber 120 communicates with the air outlet 116, and the rotary shaft 130 is rotationally connected to the main body 110. The vacuum pump rotor 146 is fixedly mounted to the rotary shaft 130 and cooperatively forms the stator cavity of the vacuum pump 142 with the inner wall 117 of the main body 110, and the air inlet 114 and the oil storage chamber 120 communicate with the stator cavity of the vacuum pump 142 respectively. Both the motor stator 160 and the motor rotor 170 are installed in the motor chamber 150, and the motor stator 160 is fixedly connected to the main body 110, and the motor rotor 170 is fixedly connected to the rotary shaft 130.

In the vacuuming device 100 provided in the present invention, the conventional vacuum pump, the conventional tank and the conventional motor are modified and cleverly combined together to form an integrated vacuuming structure. Thereby eliminating the raw materials and manufacturing costs of many components used to successively connect the conventional motor, the vacuum pump and the tank (there are four end caps arranged in the conventional motor and vacuum pump, in the vacuuming device of the present embodiment, two end caps have been omitted corresponding to the conventional motor, the remaining two end caps directly formed a sealing structure, and the sealing structure is directly used as the oil tank); and the oil tank is directly formed by the main body, rather than be set independently. In such a manner that not only the manufacturing costs can be greatly reduced, but also optimizing the spatial structure, downsizing the entire volume of the vacuuming device (or assembly length), effectively overcome the deficiencies of the conventional vacuum pump.

Figure 2:
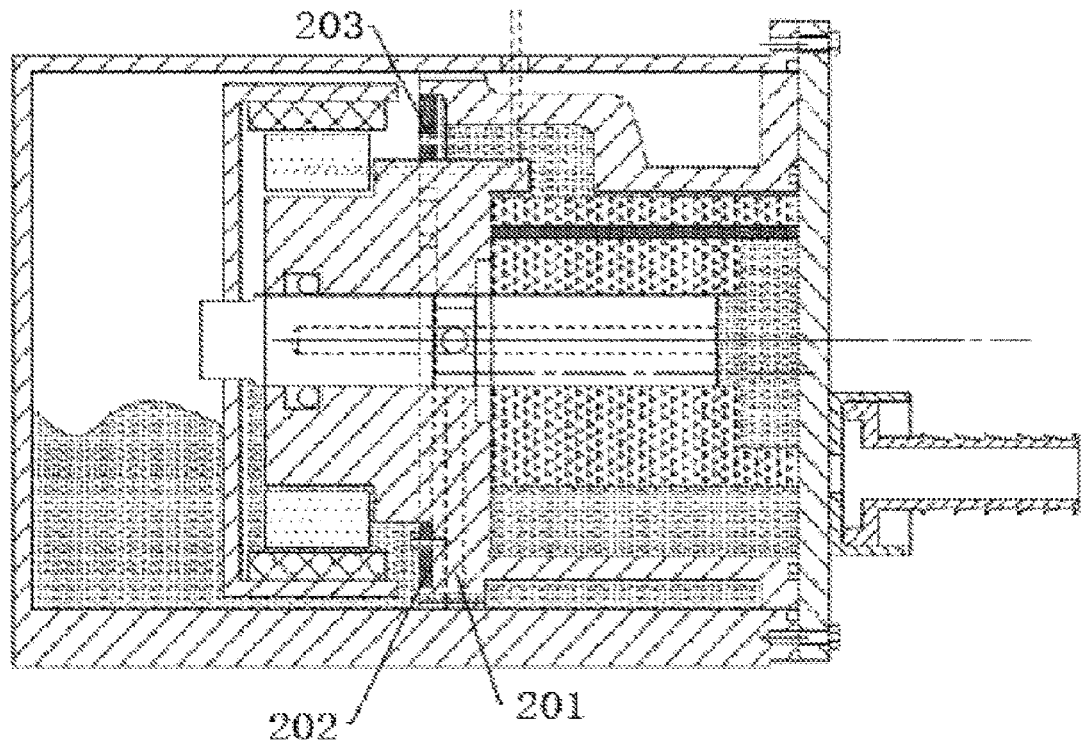
FIG. 2 is a perspective view of the second form of the first vacuuming device in accordance with an embodiment of the present invention.

Referring to FIG. 2, the above mentioned vacuuming device 100 is the first form of the present embodiment, and the second form of the vacuuming device 100 providing in the present embodiment refers to FIG. 2. The main structure 111 is provided with a communicating hole 201, and one end of the communicating hole 201 communicates with the first annular oil passage 136, the other end of the communicating hole 201 communicates with the oil storage chamber 120.

It is to be understood, the role, the effect and the principles of the communicating hole 201 is same with the oil suction pipe 139. The difference between the communicating hole 201 and the oil suction pipe 139 as follows: the communicating hole 201 is assembled on the main structure 111, thereby avoiding mounting the oil suction pipe 139; further, when setting the communicating hole 201, according to the required oil height, the communicating hole 201 can be set as an inclined opening on the main structure 111. As setting a certain inclined angle of the inclined opening, it is to be understood, if the extending direction of the communicating hole 201 is vertical, the oil suction height will be lower; if the extending direction of the communicating hole 201 is horizontal, the oil suction height will be higher, achieve that controlling the oil suction height through setting different inclined angles of the communicating hole 201.

Figure 3:
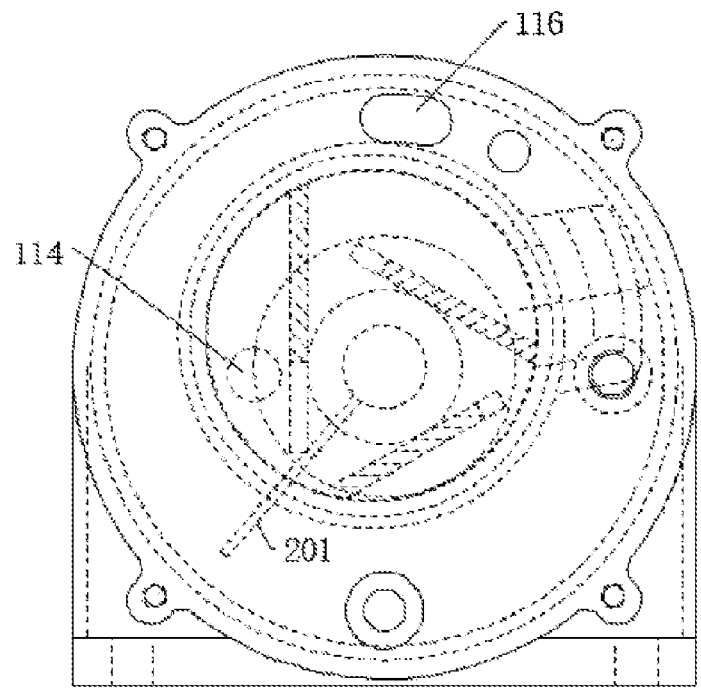
FIG. 3 is another perspective view of the first vacuuming device in FIG. 2.

In fact, if the height of the communicating hole 201 is too low, it is easy to absorb impurities into the communicating hole 201 and cause blocked, if the height of the communicating hole 201 is too high, the oil efficiency is lower, for this reason, the extending direction of the communicating hole 201 generally not design to be horizontal and vertical and the height of the communicating hole 201 generally rational designed according to actual demand. In conjunction with FIG. 3, in general, the extending direction of the communicating hole 201 will set a certain inclination angle.

In such a manner, not only the cost of labor and the raw materials can be greatly reduced, but also the difficulty of the process can be reduced, the manufacturing is much more convenient and cost-effective.

Meanwhile, preferably, the vacuuming device 100 further comprises a baffle 202 provided with an oil injection hole 203. The baffle 202 is mounted in the interior of the main structure 111 by screws and has an annular plate-shaped body. The baffle 202 is connected to one end of the inner of the main structure 111, and the position of the oil injection hole 203 is corresponding to the oil and air outlet passage 124. The oil injection hole 203 may be set at different positions of the baffle 202 to control the position of the fuel injection.

Figure 6:
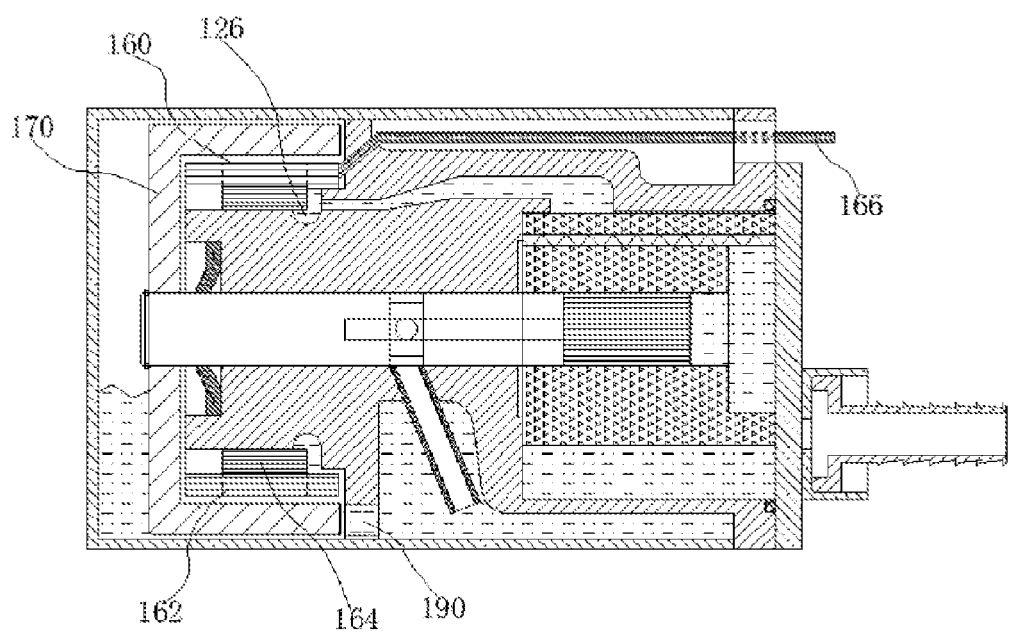
FIG. 6 is a perspective view of a second vacuuming device in accordance with an embodiment of the present invention.

Referring to FIG. 6, a second vacuuming device 100 is disclosed in this embodiment. The overall structure, the working principle and the technical effects of the second vacuuming device 100 is substantially same with the first vacuuming device 100, except that, in this embodiment, annular silicon steel sheets 164 are arranged between the motor stator 160 and the motor rotor 170, and the end of the oil and air outlet passage 124 away from the vacuum cartridge 140 communicates with a second annular oil passage 126, and the second annular oil passage 126 is bounded by the inner walls of the main body 110, the silicon steel sheets 164 and the motor stator 160.

Figure 7:
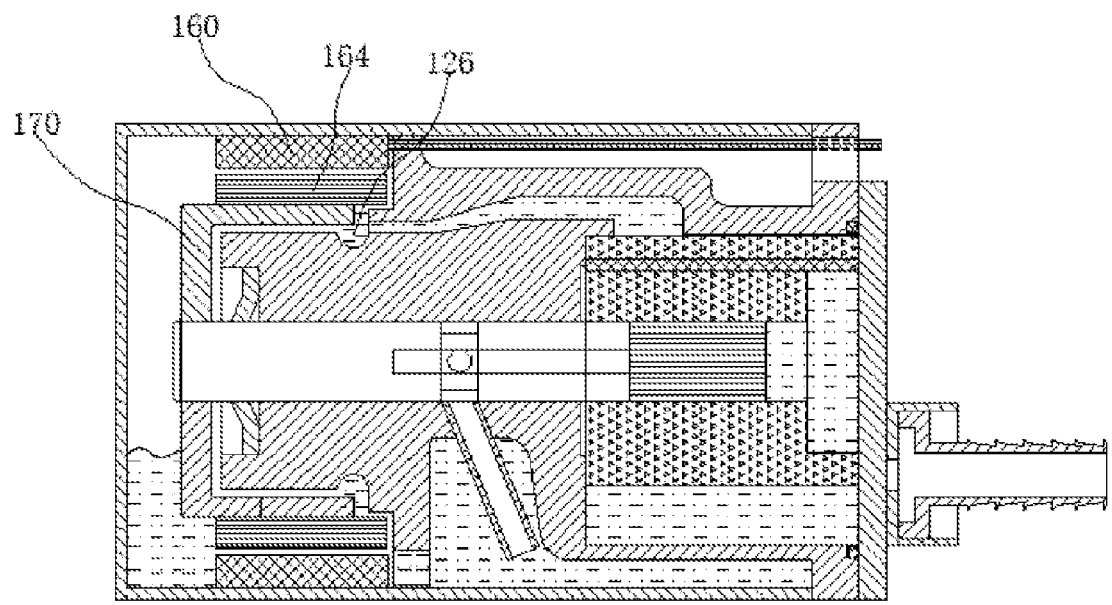
FIG. 7 is a perspective view of the first form of a third vacuuming device in accordance with an embodiment of the present invention.

Referring to FIG. 7, a third vacuuming device 100 is disclosed in this embodiment. The overall structure, the working principle and the technical effects of the third vacuuming device 100 is substantially same with the second vacuuming device 100, except that the concrete structure of the motor rotor 170 and the motor stator 160 is different.

In this embodiment, the motor rotor 170 is positioned within a region bounded by the motor stator 160, that is, the inner-rotor motor structure. Meanwhile, the second annular oil passage 126 is bounded by the inner walls of the main body 110, the silicon steel sheet 164 and the motor rotor 170.

Figure 8:
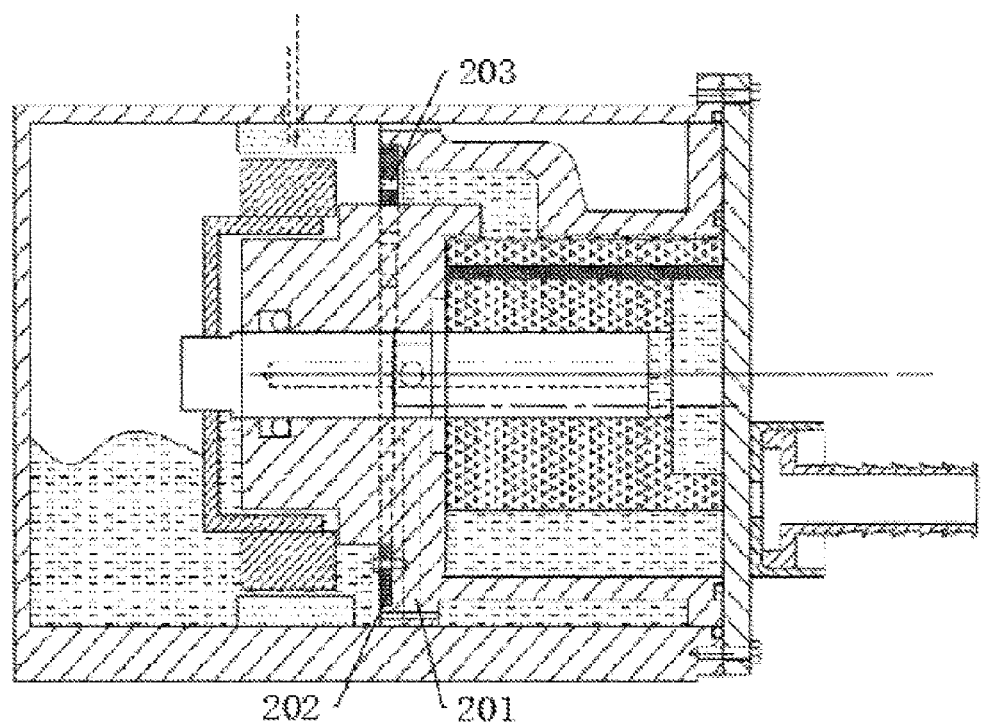
FIG. 8 is a perspective view of the second form of the third vacuuming device in accordance with an embodiment of the present invention.

Referring to FIG. 8, the above-mentioned vacuuming device 100 is the first form of the present embodiment. In conjunction with FIG. 8, the present embodiment provides a second form of the vacuuming device 100 as follows:

Preferably, the main structure 111 is provided with a communicating hole 201, and one end of the communicating hole 201 communicates with the first annular oil passage 136, the other end of the communicating hole 201 communicates with the oil storage chamber 120.

It is to be understood, the role, the effect and the principles of the communicating hole 201 is same with the oil suction pipe 139. The difference between the communicating hole 201 and the oil suction pipe 139 as follows: the communicating hole 201 is assembled on the main structure 111, thereby avoiding mounting the oil suction pipe 139; further, when setting the communicating hole 201, according to the required oil height, the communicating hole 201 can be set as an inclined opening on the main structure 111. As setting a certain inclined angle of the inclined opening, it is to be understood, if the extending direction of the communicating hole 201 is vertical, the oil suction height will be lower; if the extending direction of the communicating hole 201 is horizontal, the oil suction height will be higher, achieve that controlling the oil suction height through setting different inclined angles of the communicating hole 201.

In such a manner, not only the cost of labor and the raw materials can be greatly reduced, but also the difficulty of the process can be reduced, the manufacturing is much more convenient and cost-effective.

Meanwhile, preferably, the vacuuming device 100 further comprises a baffle 202 provided with an oil injection hole 203. The baffle 202 is mounted in the interior of the main structure 111 by screws and has an annular plate-shaped body. The baffle 202 is connected to one end of the inner of the main structure 111, and the position of the oil injection hole 203 is corresponding to the oil and air outlet passage 124. The oil injection hole 203 may be set at different positions of the baffle 202 to control the position of the fuel injection.

Referring to FIGS. 9-12, a fourth vacuuming device 100 is disclosed in this embodiment. The overall structure, the working principle and the technical effects of the fourth vacuuming device 100 is substantially same with the above vacuuming device 100, except that:

The vacuuming device 100 further comprises a pump housing 101 connected with the main body 110, and the pump housing 101 is assembled on the outside of the main body 110. A mounting space 102 and an oil tank 105 are formed between the pump housing 101 and the main body 110, and the oil tank 105 and the mounting space 102 are communicating with each other. The mounting space 102 is configured to be mounted at least one of the electrical components 103, a circuit board 104, and heat sinks 108. The oil tank 105 communicates with the oil storage chamber 120.

Figure 9:
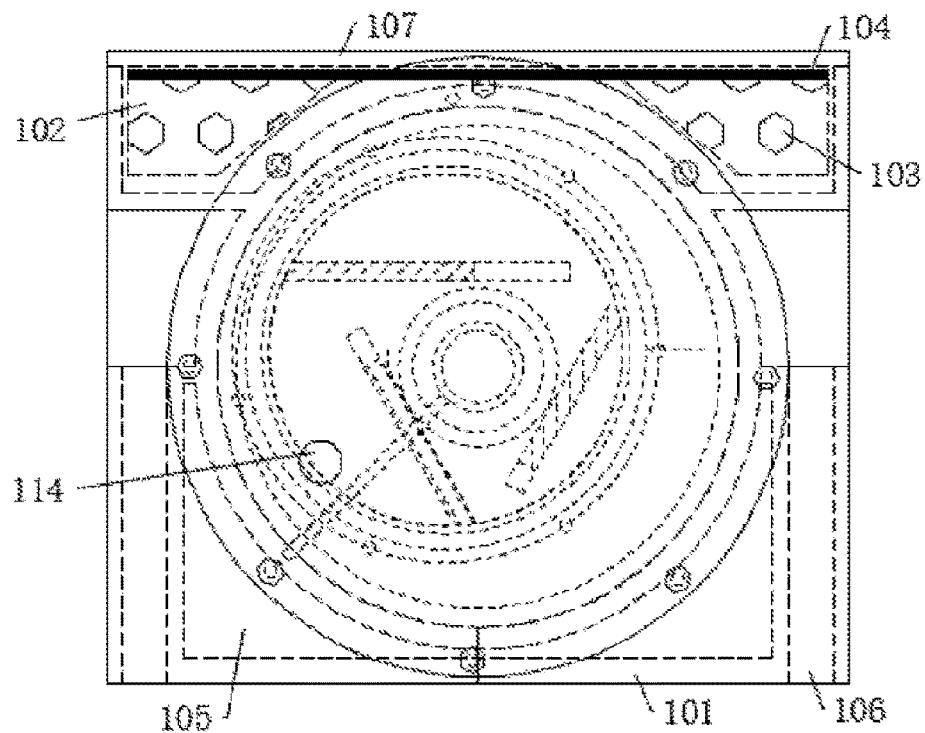
FIG. 9 is the first perspective view of a fourth vacuuming device in accordance with an embodiment of the present invention.

In conjunction with FIG. 9, it is to be understood, the mounting space 102 forming by the pump housing 101 and the main body 110 locates at the upside of the entire structure, and the oil tank 105 locates at the downside of the entire structure in conjunction with FIG. 9. The oil tank 105 and the mounting space 102 are communicating with each other.

In conjunction with FIG. 9, the electrical components 103 of the motor controller comprises a circuit board, a capacitance with comparatively high height, high power transistors, integrated circuits, silencers and so on. Generally, these components are necessary structure for a DC motor, pump exhaust noise control structure and other related structures. These components are arranged in the mounting space 102, achieve that the space utilization of the vacuuming device 100 can be greatly improved.

The pump housing 101 further connects to an electrical store cover 107. The connection way of the pump housing 101 and the electrical store cover 107 is varied, such as: rotation connection, sliding connection, detachable connection and so on, in this way, the mounting space 102 can be easily opened to remove or install the associated components.

The bottom of the pump housing 101 is provided with a mounting holes assembly 106, so as to be more convenient to install the vacuuming device on other outside structures.

Figure 10:
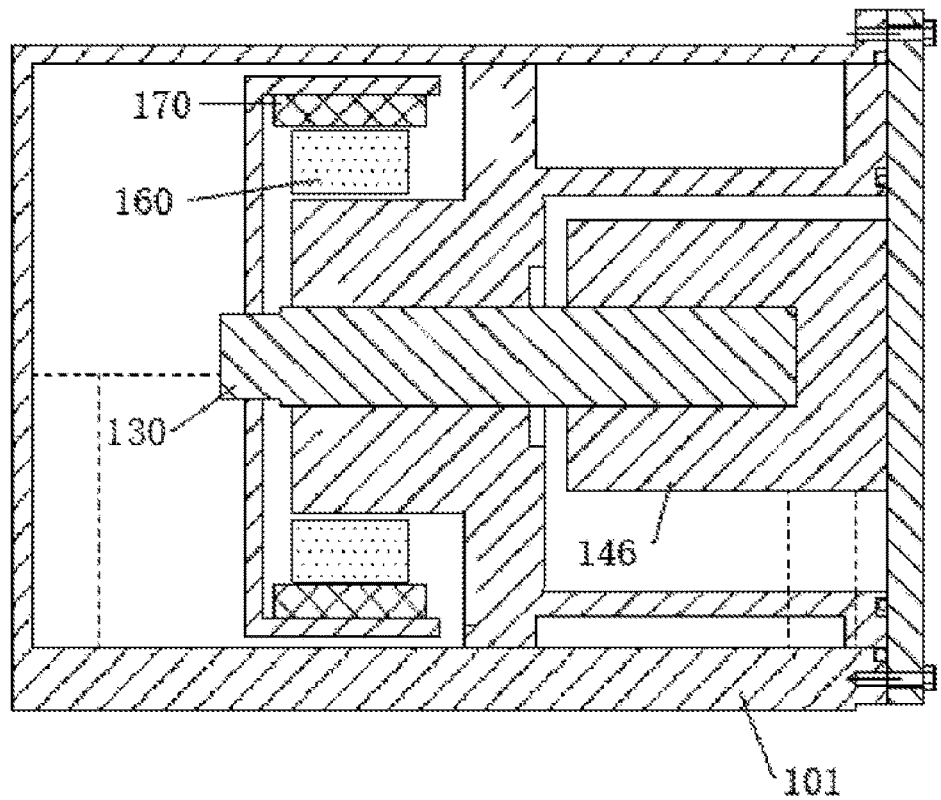
FIG. 10 is the second perspective view of the fourth vacuuming device in accordance with an embodiment of the present invention.
Figure 12:
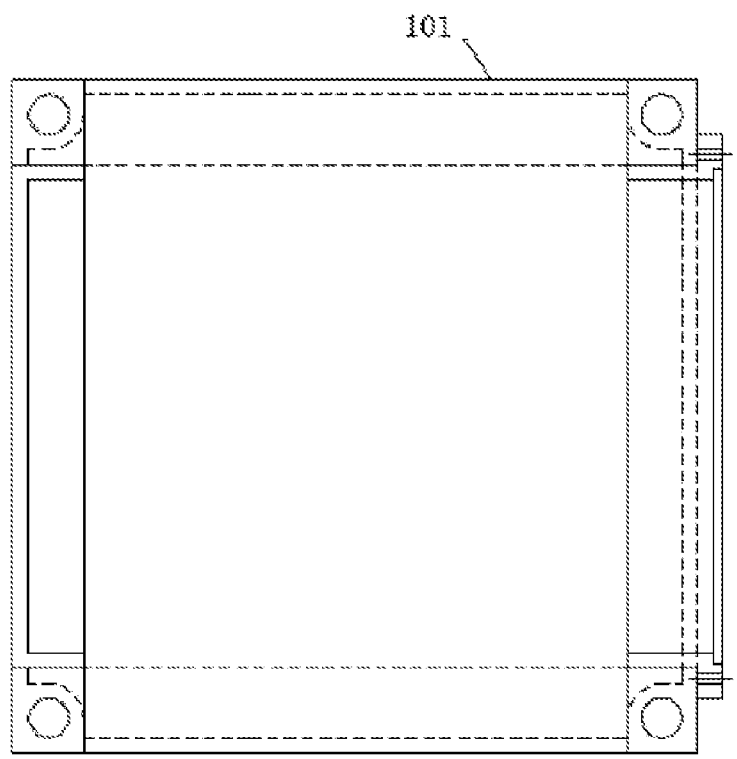
FIG. 12 is the fourth perspective view of the fourth vacuuming device in accordance with an embodiment of the present invention.

In conjunction with FIG. 9, FIG. 10 and FIG. 12, the oil tank 105 communicates with the oil storage chamber 120, in such a manner that the oil reserves can be greatly increased, and the bottom of the pump housing 101 is provided in a hollow structure, thereby further increasing the oil reserves.

Figure 11:
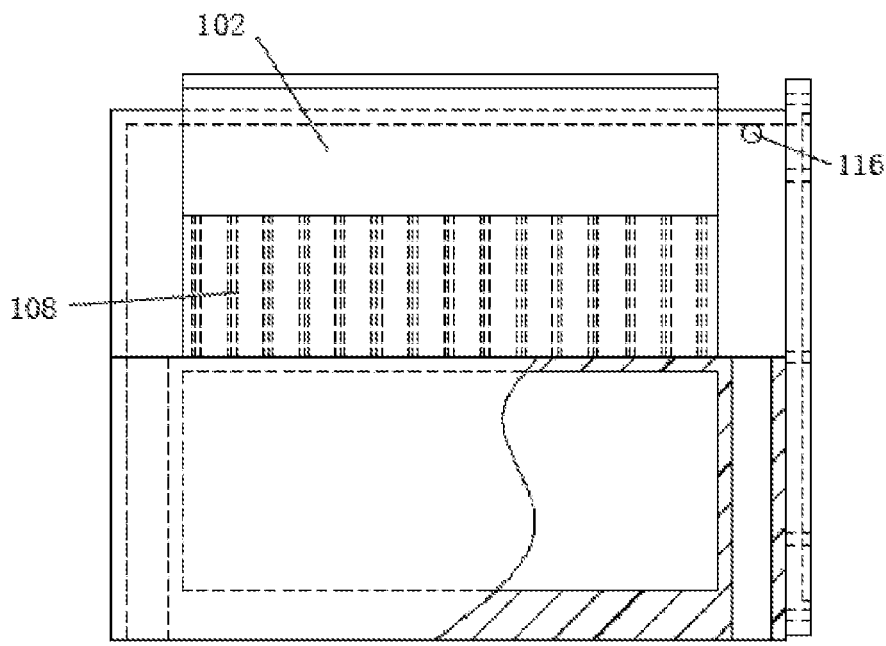
FIG. 11 is the third perspective view of the fourth vacuuming device in accordance with an embodiment of the present invention.

In conjunction with FIG. 11, the heat dissipation can be effectively improved through mounting the heat sink 108 in the vacuuming device 100.

Further, the arrangement of above-mentioned components installation effectively improves the space utilization of the vacuuming device 100, so as to enhance the degree of integration of the entire structure, improve the design reasonability, and improve the practical.

It is to be understood, the above-mentioned vacuuming device 100 integrates the vacuum pump, the oil tank and the motor consequently integrate the structure, and the three can be manufactured integrally molded. It is to be understood, the motor is shaped as cylindrical, which can be mounted on the corresponding end cap through a flange, a fastener or other similar constructs, and then the integrated device is attached to the pump housing 101 by fasteners, thereby the vacuuming device 100 becoming a stable structure.

The present embodiment further provides a vacuum apparatus comprising the vacuuming device 100 described above, which can effectively optimize its structure, reduce its size, thereby reducing manufacturing costs and remedying the defects of the conventional vacuum apparatus.

The above is merely preferred embodiments of the present disclosure, not intended to limit the present disclosure, various modifications and changes to these embodiments are obvious to any person skilled in the art. Any modification, equivalent substitutions and improvements within the spirit and principle of the present disclosure should be included within the scope of protection of the present disclosure.

The above is merely preferred embodiments of the present disclosure, not intended to limit the present disclosure, various modifications and changes to these embodiments are obvious to any person skilled in the art. Any modification, equivalent substitutions and improvements within the spirit and principle of the present disclosure should be included within the scope of protection of the present disclosure.

INDUSTRIAL PRACTICAL

In summary, the present invention provides a vacuuming device and a vacuum apparatus using the same, which is simple structure, low cost, high degree of integration.

We claim:

1. A vacuuming device, comprising a main body, a rotary shaft, a vacuum pump rotor, a motor stator and a motor rotor, wherein the main body is provided with an air inlet, an air outlet, an oil storage chamber and a motor chamber; said oil storage chamber communicates with said air outlet, and said rotary shaft is rotationally located in said main body; said vacuum pump rotor is fixedly mounted to said rotary shaft and cooperatively forms a stator cavity of a vacuum pump with an inner wall of said main body; wherein said air inlet and said oil storage chamber communicate with said stator cavity of the vacuum pump respectively; both said motor stator and said motor rotor are arranged in said motor chamber, and said motor stator is fixedly connected to said main body, and said motor rotor is fixedly connected to said rotary shaft;

wherein said main body is provided with an oil and air outlet passage, and one end of said oil and air outlet passage is corresponding to said vacuum pump rotor, the other end of the oil and air outlet passage is communicating with said motor chamber;

wherein said main body comprises a main structure, and said oil and air outlet passage located inside said main structure; an internal of said main structure is provided with a shaft mounting hole, and said shaft mounting hole is configured to install said rotary shaft, and said oil and air outlet passage is arranged above said shaft mounting hole; and wherein said main body further comprises a first end cap connected with said main structure, and said first end cap and said main structure cooperatively forms a vacuum cartridge, said oil storage chamber and a communicating chamber; said vacuum cartridge is configured to mount said vacuum pump rotor, and said vacuum cartridge is communicating with the one end of said oil and air outlet passage, and said oil storage chamber and said communicating chamber are communicating with each other; said air inlet and said air outlet are arranged on said first end cap; wherein said air inlet is communicated with said vacuum cartridge, and said air outlet is communicated with said communicating chamber.

2. The vacuuming device as claimed in claim 1, wherein a check valve corresponding to said air inlet is arranged on said first end cap to realize outside air flow into said vacuum cartridge as one-way flow.

3. The vacuuming device as claimed in claim 1, wherein said main body further comprises a second end cap attached to the first end cap; said second end cap and said main structure cooperatively define said motor chamber, and said motor chamber is communicating with the other end of the oil and air outlet passage away from said vacuum cartridge.

4. The vacuuming device as claimed in claim 1, wherein a gap is arranged between said motor stator and said motor rotor, and the oil and air outlet passage communicates with said motor chamber through said gap.

5. The vacuuming device as claimed in claim 4, wherein said gap communicates with said oil storage chamber through a through-hole.

6. The vacuuming device as claimed in claim 1, wherein said rotary shaft is provided with a first annular oil passage, an oil suction hole and an oil suction passage; wherein said oil storage chamber, said first annular oil passage, said oil suction hole, said oil suction passage, and said stator cavity of the vacuum pump successively communicate with one another.

7. The vacuuming device as claimed in claim 6, wherein said first annular oil passage is disposed on the outer wall of said rotary shaft; said oil suction hole extends along the radial direction of said rotary shaft, and said oil suction passage is assembled in the internal of said rotary shaft and extends along the axial direction of said rotary shaft.

8. The vacuuming device as claimed in claim 6, wherein an oil suction pipe is disposed on said main body, and one end of said oil suction pipe communicates with said first annular oil passage, the other end of said oil suction pipe communicates with said oil storage chamber.

9. The vacuuming device as claimed in claim 6, wherein said main structure further comprises a communicating hole, and one end of said communicating hole communicates with said first annular oil passage, the other end of said communicating hole communicates with said oil storage chamber.

10. The vacuuming device as claimed in claim 1, wherein said motor stator connects to a wiring harness extending outside of said main body via said air outlet; a gap is arranged between said motor stator and said motor rotor, and said gap communicates with said oil storage chamber through a through hole running through said motor stator and said main body; said oil and air outlet passage assembled on said main body communicates with said motor chamber through said gap.

11. The vacuuming device as claimed in claim 1, wherein said motor stator is arranged inside a region bounded by said motor rotor.

12. The vacuuming device as claimed in claim 1, wherein said rotary shaft comprises a pump shaft and a motor shaft, and said pump shaft is molded in one body with said motor shaft.

13. A vacuum apparatus, comprising the vacuuming device as claimed in claim 1.

14. A vacuuming device, comprising a main body, a rotary shaft, a vacuum pump rotor, a motor stator and a motor rotor, wherein the main body is provided with an air inlet, an air outlet, an oil storage chamber and a motor chamber; said oil storage chamber communicates with said air outlet, and said rotary shaft is rotationally located in said main body; said vacuum pump rotor is fixedly mounted to said rotary shaft and cooperatively forms a stator cavity of a vacuum pump with an inner wall of said main body; wherein said air inlet and said oil storage chamber communicate with said stator cavity of the vacuum pump respectively; both said motor stator and said motor rotor are arranged in said motor chamber, and said motor stator is fixedly connected to said main body, and said motor rotor is fixedly connected to said rotary shaft;

wherein said rotary shaft is provided with a first annular oil passage, an oil suction hole and an oil suction passage; wherein said oil storage chamber, said first annular oil passage, said oil suction passage, and said stator cavity of the vacuum pump successively communicate with one another.

15. A vacuuming device, comprising a main body, a rotary shaft, a vacuum pump rotor, a motor stator and a motor rotor, wherein the main body is provided with an air inlet, an air outlet, an oil storage chamber and a motor chamber; said oil storage chamber communicates with said air outlet, and said rotary shaft is rotationally located in said main body; said vacuum pump rotor is fixedly mounted to said rotary shaft and cooperatively forms a stator cavity of a vacuum pump with an inner wall of said main body; wherein said air inlet and said oil storage chamber communicate with said stator cavity of the vacuum pump respectively; both said motor stator and said motor rotor are arranged in said motor chamber, and said motor stator is fixedly connected to said main body, and said motor rotor is fixedly connected to said rotary shaft;

wherein said motor stator connects to a wiring harness extending outside of said main body via said air outlet; a gap is arranged between said motor stator and said motor rotor, and said gap communicates with said oil storage chamber through a through hole running through said motor stator and said main body; said oil and air outlet passage assembled on said main body communicates with said motor chamber through said gap.

\* \* \* \* \*